United States Patent
Zhang et al.

(10) Patent No.: US 11,530,331 B2
(45) Date of Patent: Dec. 20, 2022

(54) FUNCTIONAL INK SUITABLE FOR 3D PRINTING AND PREPARATION METHOD THEREOF

(71) Applicant: Sichuan University, Chengdu (CN)

(72) Inventors: Chuhong Zhang, Chengdu (CN); Wenbin Kang, Chengdu (CN); Li Zeng, Chengdu (CN); Shangwen Ling, Chengdu (CN)

(73) Assignee: SICHUAN UNIVERSITY, Chengdu (CN)

( * ) Notice: Subject to any disclaimer, the term of this patent is extended or adjusted under 35 U.S.C. 154(b) by 0 days.

(21) Appl. No.: 17/420,722

(22) PCT Filed: Dec. 30, 2019

(86) PCT No.: PCT/CN2019/129799
§ 371 (c)(1),
(2) Date: Jul. 6, 2021

(87) PCT Pub. No.: WO2020/147567
PCT Pub. Date: Jul. 23, 2020

(65) Prior Publication Data
US 2022/0064471 A1 Mar. 3, 2022

(30) Foreign Application Priority Data

Jan. 18, 2019 (CN) .......................... 201910047850.X

(51) Int. Cl.
*C09D 11/52* (2014.01)
*B33Y 70/00* (2020.01)
(Continued)

(52) U.S. Cl.
CPC .............. *C09D 11/52* (2013.01); *B33Y 70/00* (2014.12); *B41J 2/2107* (2013.01); *C09D 11/02* (2013.01);
(Continued)

(58) Field of Classification Search
CPC ..... C09D 11/52; C09D 11/033; C09D 11/037; C09D 11/08; C09D 11/102; C09D 11/106;
(Continued)

(56) References Cited

U.S. PATENT DOCUMENTS

| 2002/0137816 A1* | 9/2002 | Malhotra | ............... C09D 11/34 523/160 |
| 2009/0117087 A1* | 5/2009 | Carroll | ................. C12N 5/0656 424/572 |

(Continued)

FOREIGN PATENT DOCUMENTS

| CN | 1796654 A | 7/2006 |
| CN | 107936685 A | 4/2018 |

(Continued)

OTHER PUBLICATIONS

Patrycja Domalik-Pyzik, et al., Characterization of Graphene Oxide-Loaded Chitosan Hydrogels and their Application for 3D Printing, Engineering of Biomaterials, 2017, pp. 83, 143.

*Primary Examiner* — Manish S Shah
(74) *Attorney, Agent, or Firm* — Bayramoglu Law Offices LLC

(57) ABSTRACT

A functional ink suitable for 3D printing and a preparation method thereof are provided. The ink includes the following components in parts by weight: 0.5-1.5 parts of a regulator, 1-5 parts of a conductive material, 0.1-0.5 parts of a cross-linking agent, 0.1-0.5 parts of a catalyst, and 10-80 parts of a solvent. The prepared functional ink has a self-healing function at room temperature, eliminating the interface resistance between printing layers and improving the mechanical strength between the layers. Moreover, the prepared functional ink has excellent electrical conductivity and a variety of electrical, magnetic, and electrochemical prop- (Continued)

erties, and can be applied in the fields of functional materials and devices such as energy storage, electromagnetic shielding and stress sensing.

10 Claims, 9 Drawing Sheets

(51) Int. Cl.
| | |
|---|---|
| *C09D 11/033* | (2014.01) |
| *C09D 11/037* | (2014.01) |
| *C09D 11/08* | (2006.01) |
| *C09D 11/102* | (2014.01) |
| *C09D 11/106* | (2014.01) |
| *C09D 11/14* | (2006.01) |
| *H01M 4/04* | (2006.01) |
| *C09D 11/02* | (2014.01) |
| *B41J 2/21* | (2006.01) |
| *B33Y 80/00* | (2015.01) |
| *H01M 4/58* | (2010.01) |
| *H01M 4/02* | (2006.01) |

(52) U.S. Cl.
CPC .......... *C09D 11/033* (2013.01); *C09D 11/037* (2013.01); *C09D 11/08* (2013.01); *C09D 11/102* (2013.01); *C09D 11/106* (2013.01); *C09D 11/14* (2013.01); *H01M 4/0402* (2013.01); *B33Y 80/00* (2014.12); *H01M 4/5825* (2013.01); *H01M 2004/028* (2013.01)

(58) Field of Classification Search
CPC ......... C09D 11/14; C09D 11/10; C09D 11/03; C09D 11/36; C09D 11/40; C09D 11/30; C09D 11/38; C09D 11/32; C09D 11/322; C09D 11/324; C09D 11/328; C09D 11/101; C09D 11/005; C09D 11/54; B33Y 70/00; B33Y 80/00; H01M 4/0402; H01M 4/5825; H01M 2004/028; H01M 2300/0037; H01M 10/052; B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598

See application file for complete search history.

(56) References Cited

U.S. PATENT DOCUMENTS

| | | | | |
|---|---|---|---|---|
| 2010/0009094 | A1* | 1/2010 | Lochtman | H05K 3/027 427/554 |
| 2014/0345910 | A1* | 11/2014 | Wang | G06F 3/0446 174/257 |
| 2015/0307728 | A1* | 10/2015 | Omenetto | A61K 33/24 428/209 |
| 2016/0083601 | A1* | 3/2016 | Secord | B41J 2/1721 347/77 |
| 2016/0200927 | A1* | 7/2016 | Wu | C09D 11/36 106/31.86 |
| 2017/0218228 | A1* | 8/2017 | Jose | B29C 64/20 |
| 2017/0252971 | A1* | 9/2017 | Umebayashi | C09D 11/34 |
| 2018/0079923 | A1* | 3/2018 | Umebayashi | B33Y 30/00 |
| 2018/0298215 | A1* | 10/2018 | Andersen | C04B 35/46 |
| 2018/0310366 | A1* | 10/2018 | Nelson | B41M 1/12 |
| 2018/0311892 | A1* | 11/2018 | Abbott, Jr. | B41M 5/007 |

FOREIGN PATENT DOCUMENTS

| | | |
|---|---|---|
| CN | 108452375 A | 8/2018 |
| WO | 2018071639 A1 | 4/2018 |

* cited by examiner

Cut

Contact and heal

Stretch

Conductive

Cut

Conductivity restored after healing

FUNCTIONAL INK SUITABLE FOR 3D PRINTING AND PREPARATION METHOD THEREOF

CROSS REFERENCE TO THE RELATED APPLICATIONS

This application is the national phase entry of International Application No. PCT/CN2019/129799, filed on Dec. 30, 2019, which is based upon and claims priority to Chinese Patent Application No. 201910047850.X, filed on Jan. 18, 2019, the entire contents of which are incorporated herein by reference.

TECHNICAL FIELD

The present invention relates to the technical field of three-dimensional (3D) printing, and in particular, to a functional ink suitable for 3D printing and a preparation method thereof.

BACKGROUND 3D printing technology, also known as additive manufacturing technology, is a way of manufacturing layer-by-layer by adding materials based on 3D model data, which is completely opposite to the traditional material processing method. An advantage of 3D printing is that one is able to construct complex structures having arbitrary shapes, and realize the rapid and efficient production of three-dimensional structure. Due to its unique characteristics of dimension reduction and rapid layer-by-layer processing, 3D printing provides unlimited possibilities for the next generation of manufacturing technology. Additive manufacturing is the development direction supported by the 13th Five-Year Plan in China.

In recent years, 3D printing technology has developed rapidly in the preparation of structural materials, but it has fallen short with respect to the manufacture of functional devices having special utility and performance. Unlike shapes, functions are difficult to realize via printing. As a result, there is a desire to meet this urgent need in 3D printing industry. The existing 3D printing technologies mainly include fused deposition modeling (FDM), selective laser melting (SLM), stereolithography appearance (SLA), and direct ink writing (DIW). The DIW technology exhibits great potential in the application of preparing complex functional devices because of its wide selection of printing materials, easy printing at room temperature, simple procedure and low cost. Functional ink is the key that determines its processability and the final performance of the printed functional devices, and it is also the biggest difficulty of the direct ink writing 3D printing process.

Currently, there are numerous problems with existing methods for preparing 3D printing functional ink, including: 1. it is difficult to prepare a conductive ink suitable for 3D printing with uniform composition and stable dispersion at high concentrations; 2. the content of active substances in the ink is low, and the functional performance of printed devices is poor; 3. the interaction between layers obtained by the layer-by-layer printing is weak with inevitably created interfacial resistance, and the performance of the devices therefore decays rapidly with the increase of layers.

SUMMARY

In view of the above-mentioned deficiencies in the prior art, the present invention provides a functional ink suitable for 3D printing and a preparation method thereof. The new ink and method solve the problem that the existing ink has no self-healing function at room temperature, and the printed products have poor mechanical coalescence between layers and large interface resistance.

In order to achieve the above-mentioned objective, the technical solution adopted by the present invention to solve the technical problem is as follows.

A functional ink suitable for 3D printing includes the following components in parts by weight:

0.5-1.5 parts of a regulator, 1-5 parts of a conductive material, 0.1-0.5 parts of a crosslinking agent, 0.1-0.5 parts of a catalyst, and 10-80 parts of a solvent.

The regulator provides a reversible dynamic intermolecular interaction or a reversible dynamic intramolecular interaction at room temperature.

Further, the functional ink also includes 0-10 parts of a functional nanomaterial.

Further, the reversible dynamic interaction is realized by reversible dynamic bonds, and the reversible dynamic bonds are covalent bonds, hydrogen bonds or ion coordination bonds.

Further, the regulator is at least one selected from the group consisting of chitosan, polyvinyl alcohol, nanocellulose, polyethylene glycol, catechin and tannic acid.

Further, the conductive material is a conductive carbon material, a conductive polymer or a conductive metal particle.

Further, the crosslinking agent is polymaleic acid, citric acid, propane-1,2,3-tricarboxylic acid, butane-1,2,3,4-tetracarboxylic acid, glutaraldehyde or borate.

Further, the catalyst is sulfuric acid, hydrochloric acid, phosphoric acid, phosphomolybdic acid, potassium bisulfate, aluminum chloride, ferric chloride, sodium bisulfate, sodium hypophosphite, sodium acetate, aluminium oxide, silicon dioxide, zinc oxide or titanium dioxide.

Further, the functional nanomaterial is at least one selected from the group consisting of a metal oxide, a metal sulfide, a transition metal carbide, a transition metal nitride, an inorganic nonmetallic element, a redox small molecule, a phosphate and a titanate, which provide different functionalities such as conductivity, charge storage ability, and magnetism.

Further, the functional nanomaterial is at least one selected from the group consisting of $SnO_2$, $Fe_3O_4$, $MnO_2$, $MoS_2$, $SnS_2$, MXenes, $TiN_x$, $MoN_x$, Si, Sn, Viologen, $LiFePO_4$ and $Li_4Ti_5O_{12}$.

Further, the solvent is water, ionic liquid, acetic acid, urea, thiourea, N, N-dimethylacetamide, dimethyl sulfoxide or N-methylmorphine.

A preparation method of the functional ink suitable for the 3D printing includes the following steps.

Under conditions of 20-35° C. and 8000-30000 r/min, the components are mixed and stirred for 20-60 min according to the formulation.

The specific process of the 3D printing with the functional ink suitable for the 3D printing is as follows:

(1) loading the prepared functional ink into a syringe barrel of a 3D printer, and then running a pneumatically driven dispenser at a speed of 5-10 mm/s;

(2) under a condition of 120-200° C., heating the product obtained in step (1) for 30-100 min, and washing followed by drying at 50-100° C. for 12-30 h.

Further, a heating time in step (2) is 40-60 min.

Further, a drying temperature in step (2) is 60-90° C., and a drying time is 20-24 h.

The advantages of the present invention are as follows.

1. The regulator, which enables the reversible dynamic intermolecular interaction or reversible dynamic intramolecular interaction at room temperature, is added to the formulation. The regulator contributes to reversible bonds or intermolecular dynamic interaction at room temperature, so that the ink prepared by the present invention has a self-healing function at room temperature. Therefore, when the 3D printing is carried out, the autonomous self-healing effect of the ink at room temperature eliminates the interface resistance between printing layers, enhances the interaction between the printed layers, and effectively improves the electrical, magnetic, electrochemical properties of the functional devices printed by using the ink.

2. The crosslinking and catalyst agents promote the crosslinking reaction between polymer chains in the formulation that fosters the development of a sturdy reticulate network with desired mechanical properties.

3. According to actual needs of the products to be prepared, the functional nanomaterials with different properties are selected to prepare the functional inks with different functions and applications.

4. The ink prepared by the present invention has excellent electrical conductivity, self-healing and multiple functions, which can be widely applied in the fields of functional devices such as energy storage, electromagnetic shielding and stress sensing.

BRIEF DESCRIPTION OF THE DRAWINGS

FIG. 1A is a digital image of a sample subjected to cutting; FIG. 1B is a digital image of it after self-healing; FIG. 1C is is a photo showing functional ink stretching after self-healing to illustrate the robustness of the healed interface; FIG. 1D is a digital image demonstrating the electrical conductivity of the functional ink before the cutting; FIG. 1E is a digital image showing the interface created after cutting reflected by the LED light turned off; and FIG. 1F demonstrates the healed interface and restored electrical conductivity of the functional ink after the self-healing;

FIG. 2A is an image showing the original sample before the cutting; FIG. 2B is an image showing the incision after the cutting; FIG. 2C shows the sample under healing for 0 s; FIG. 2D shows the sample under-healing for 2 s; FIG. 2E shows the sample under healing for 4 s; FIG. 2F shows the sample under healing for 6 s; FIG. 2G shows the sample under healing for 10 s; and FIG. 2H shows the sample under healing for 20 s;

FIG. 4A is a diagram showing a cyclic voltammetry curve of a printed sample at a scanning rate of 0.1 mV/S; and FIG. 4B is a diagram showing a charge/discharge curve of the printed sample at a current density of 100 mA/g;

FIG. 5A is a diagram showing shielding effect of printed samples with thickness of 0.22 mm and 0.8 mm; and FIG. 5B is a diagram showing an absorption rate curve of a 0.22 mm 3D printed sample at a frequency of 8-12 GHz;

DETAILED DESCRIPTION OF THE EMBODIMENTS

The specific embodiments of the present invention are described below to facilitate those skilled in the art to understand the present invention. However, it should be clear that the present invention is not limited to the scope of specific embodiments. For those ordinarily skilled in the art, these modifications are obvious as long as various modifications are made within the spirit and scope of the present invention as defined and determined by claims, and all inventions and creations utilizing the concepts of the present invention shall fall into the protection scope.

Embodiment 1

A functional ink suitable for 3D printing includes the following components in parts by weight:

0.6 parts of tannic acid, 1 part of graphene, 0.2 parts of polymaleic acid, 0.2 parts of ferric chloride, and 30 parts of deionized water.

A preparation method of the functional ink is as follows: mixing the above-mentioned components, stirring for 30 min at 25° C. and 20000 r/min to obtain the functional ink.

Performance tests are performed on the prepared functional ink, and test results are shown in FIGS. 1A-1F and FIGS. 2A-2H.

FIGS. 1A-1F and FIGS. 2A-2H are the test results showing the self-healing performance of the prepared functional ink at room temperature. According to the test results in FIGS. 1A-1F and FIGS. 2A-2H, the functional ink prepared by the present invention rapidly completes self-healing that restores mechanical properties and electrical conductivity within 4 s at room temperature, indicating that the functional ink has excellent self-healing performance.

A method of the 3D printing with the functional ink includes the following steps.

(1) The prepared functional ink is housed in a syringe barrel, the ink is extruded from a needle with a diameter of 0.10 mm under a pneumatic pressure of 12 Psi provided from an air-powered dispenser, and the printing is performed at a speed of 6 mm/s according to a preset program to obtain a product with different layers.

(2) The product obtained in step (1) is heated at 170° C. for 45 min, washed with deionized water for several times, and then dried in a vacuum oven at 80° C. for 24 h to obtain a printed sample.

A three-electrode system is adopted to test the capacitance performance of the printed sample, where, the printed sample is a working electrode, a saturated calomel electrode is a reference electrode, a platinum electrode is a counter electrode, an electrolyte is 1 M sulfuric acid solution, a potential is 0-0.9 V.

Figure 1A:
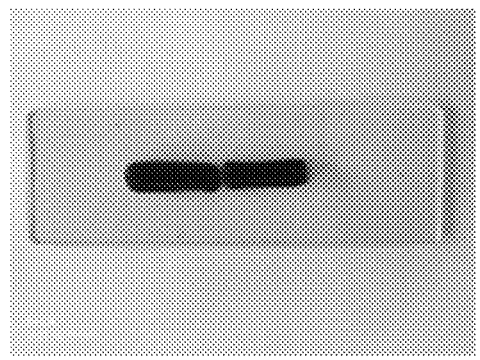
FIGS. 1A-1F are diagrams demonstrating the self-healing ability for the restoration of mechanical properties and electrical conductivity of a functional ink; where.
Figure 1B:
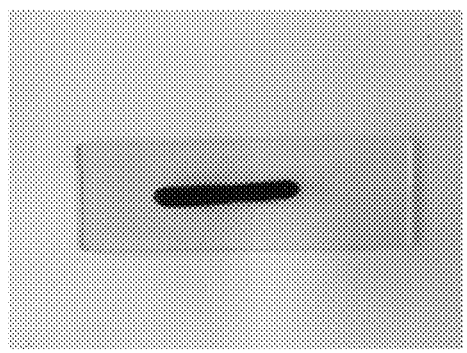
Figure 1C:
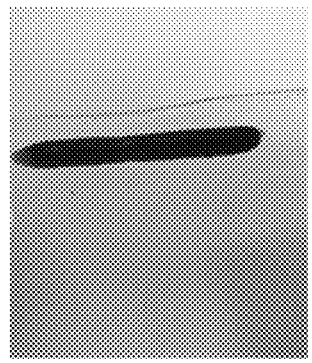
Figure 1D:
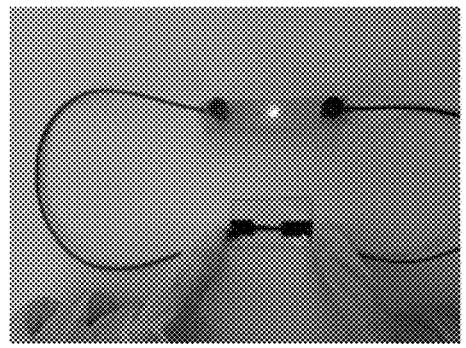
Figure 1E:
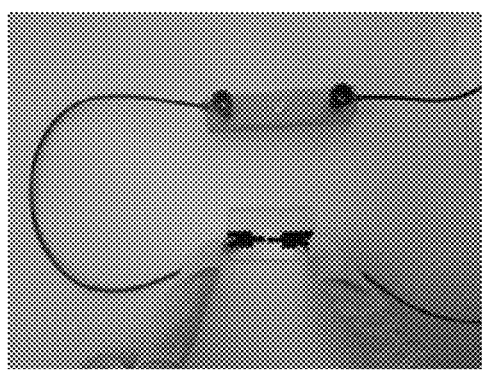
Figure 1F:
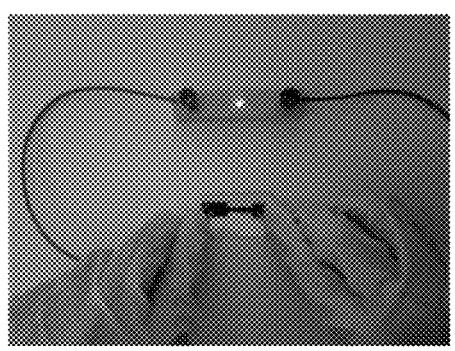
Figure 2A:
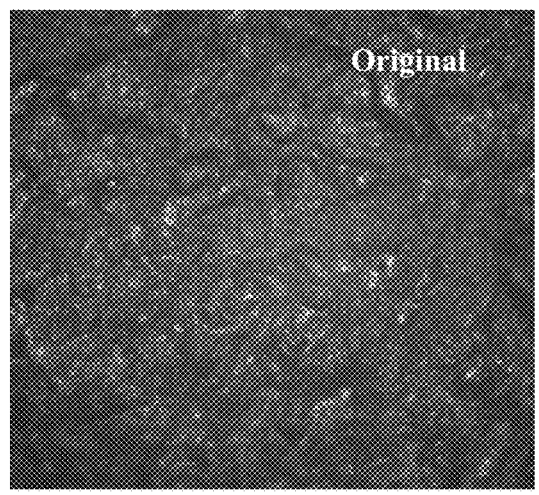
FIGS. 2A-2H are images captured from an optical microscope showing the dynamic evolution of the healing interface of the incision made on the functional ink; where.
Figure 2B:
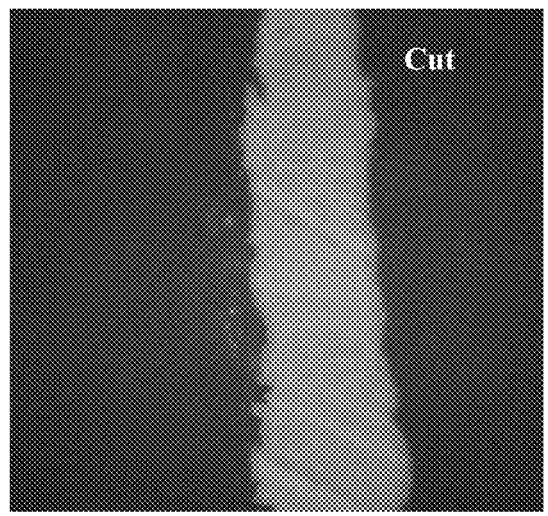
Figure 2C:
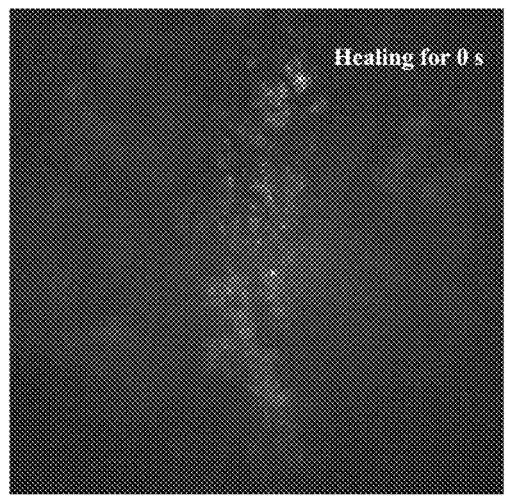
Figure 2D:
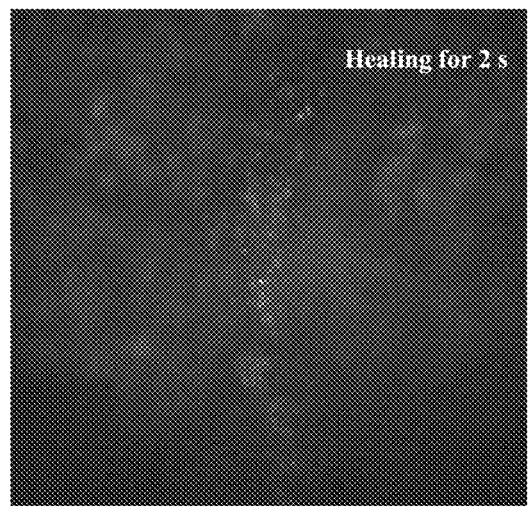
Figure 2E:
Figure 2F:
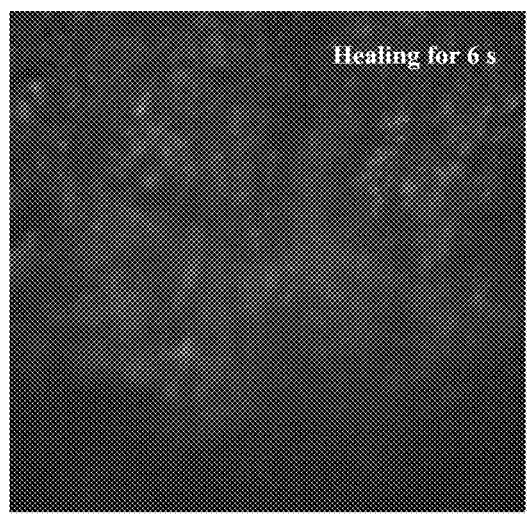
Figure 2G:
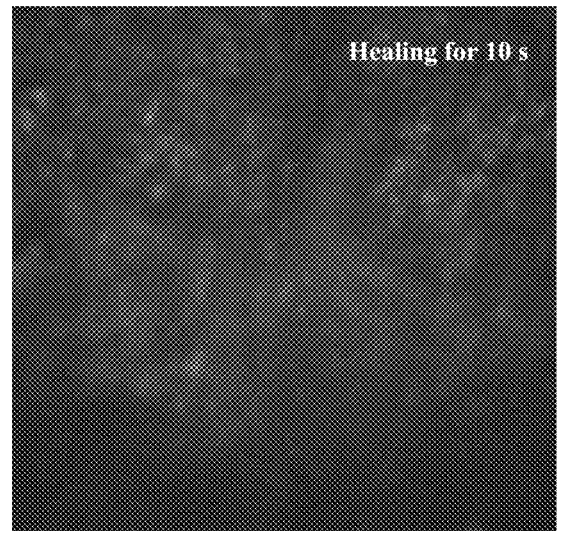
Figure 2H:
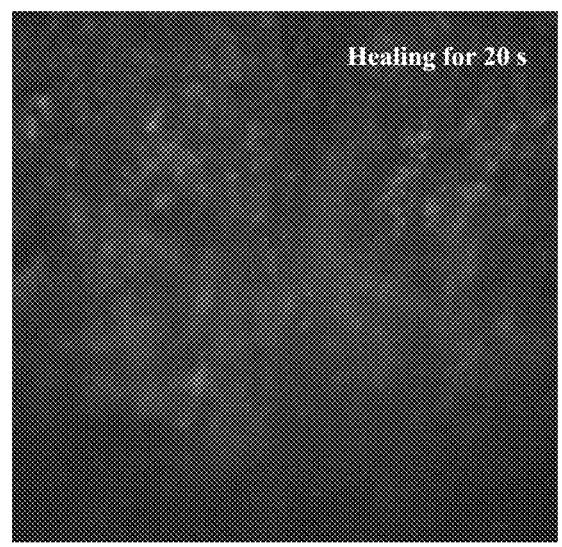
Figure 3:
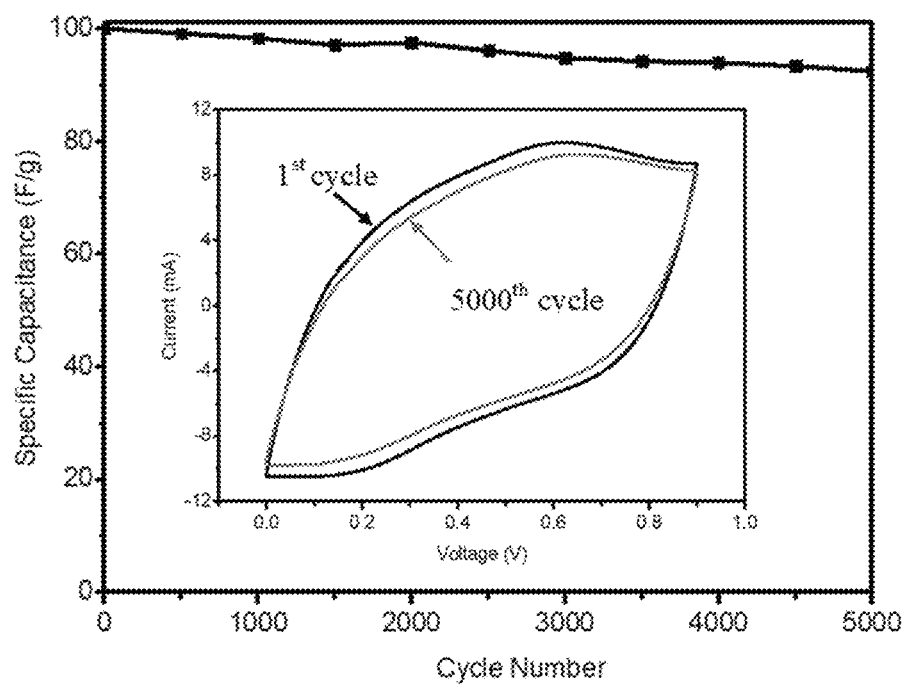
FIG. 3 is a diagram showing cyclic stability test results of a 3D printed supercapacitor prepared in embodiment 1.

FIG. 3 shows a capacity measurement of the prepared printed sample; the printed sample prepared by the present invention maintains more than 90% of the reversible capacity after 5000 cycles; it should be mentioned that, with the increase of printing layers, the gravimetric capacitance of the printed electrode basically remains unchanged, which is otherwise subject to obvious degradation without proper coalescence of the interface. As a result, the areal capacitance of the printed electrodes manage to increase linearly. Therefore, the functional ink prepared by the method of the present invention may be applied to the preparation of a high-performance supercapacitor by 3D printing.

Embodiment 2

A functional ink suitable for 3D printing includes the following components in parts by weight:

0.8 parts of polyvinyl alcohol, 1 part of a single-walled carbon nanotube, 0.3 parts of borate, 0.3 parts of sulfuric acid, 8 parts of lithium iron phosphate, and 40 parts of deionized water.

A preparation method of the functional ink is as follows: mixing the above-mentioned components, stirring for 45 min at 35° C. and 30000 r/min to obtain the functional ink.

A method of the 3D printing with the functional ink includes the following steps.

(1) The prepared functional ink is housed in a syringe barrel, the ink is extruded from a needle with a diameter of 0.10 mm under a pneumatic pressure of 18 Psi provided from an air-powered dispenser, and the printing is performed at a speed of 8 mm/s according to a preset program.

(2) The product obtained in step (1) is heated at 120° C. for 55 min, washed with deionized water for several times, and then dried in a vacuum oven at 60° C. for 20 h to obtain a printed sample.

Figure 4A:
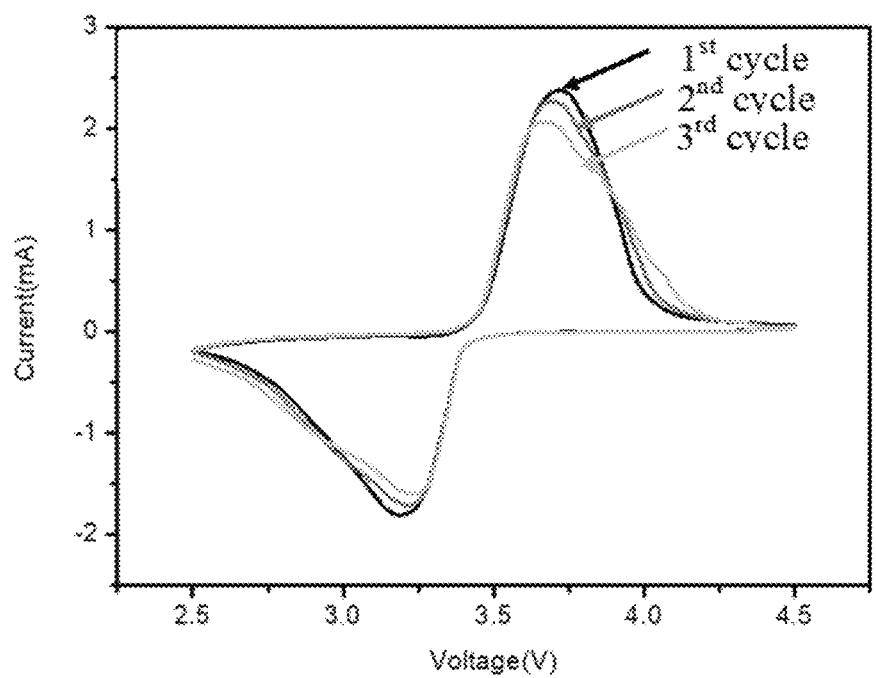
FIGS. 4A-4B are diagrams showing electrochemical performance test results of a 3D printed $LiFePO_4$ lithium-ion battery cathode material prepared in embodiment 2; where.
Figure 4B:
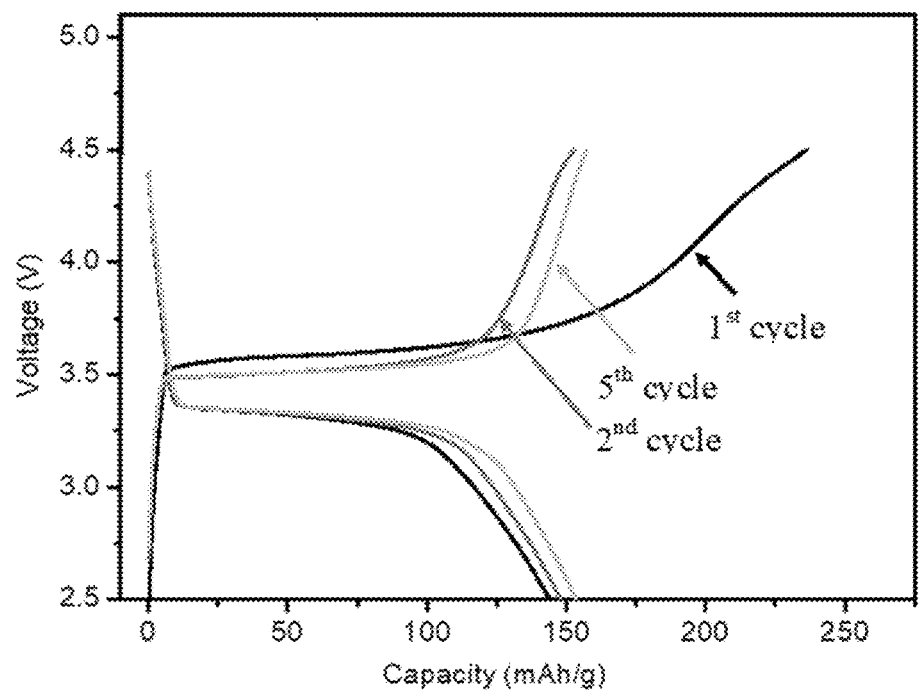

The electrochemical performance of a lithium-ion battery of the printed sample is tested:

The printed sample is a working electrode, lithium is a counter electrode, an electrolyte is 1 mol/L lithium hexafluorophosphate, a solvent is a mixture of ethylene carbonate and dimethyl carbonate at a volume ratio of 1:1, a testing potential is 2.5-4.5 V; a scanning rate of a cyclic voltammetry test is 0.1 mV/s, a current density of a constant current charge/discharge test is 100 mA/g, and the results are shown in FIGS. 4A-B.

As mentioned above, the prepared functional ink has a good electrical conductivity and good self-healing performance, and the functional ink allows for continuous and consistent 3D printing at room temperature. As shown in FIGS. 4A-B, FIG. 4A shows typical oxidation and reduction peaks of the electrochemically active material (i.e., lithium iron phosphate) at 3.75 V and 3.25 V of the printed sample prepared by 3D printing at the scanning rate of 0.1 mV/s; FIG. 4B shows that after several cycles of charging/discharging, the coulomb efficiency of the battery electrode is substantially improved, and the electrode provides approximately 150 mAh/g reversible capacity close to theoretical capacity. Therefore, the printed sample prepared by the present invention has excellent electrochemical performance, and the functional ink prepared by the method of the present invention may be applied to the preparation of the lithium-ion battery cathode by 3D printing.

Embodiment 3

A functional ink suitable for 3D printing includes the following components in parts by weight:

0.8 parts of nanocellulose, 2 parts of poly (3,4-ethylenedioxythiophene), 0.25 parts of propane-1,2,3-tricarboxylic acid, 0.25 parts of sodium hypophosphite, and 50 parts of deionized water.

A preparation method of the functional ink is as follows: mixing the above-mentioned components, stirring for 50 min at 30° C. and 15000 r/min to obtain the functional ink.

A method of 3D printing with the functional ink includes the following steps.

(1) The prepared functional ink is housed in a syringe barrel, the ink is extruded from a needle with a diameter of 0.80 mm under a pneumatic pressure of 15 Psi provided from an air-powered dispenser, and the printing is performed at a speed of 7 mm/s according to a preset program to obtain products with different layers.

(2) The products obtained in step (1) are heated at 150° C. for 50 min, washed with deionized water for several times, and then dried in a vacuum oven at 60° C. for 24 h to obtain printed samples.

Figure 5A:
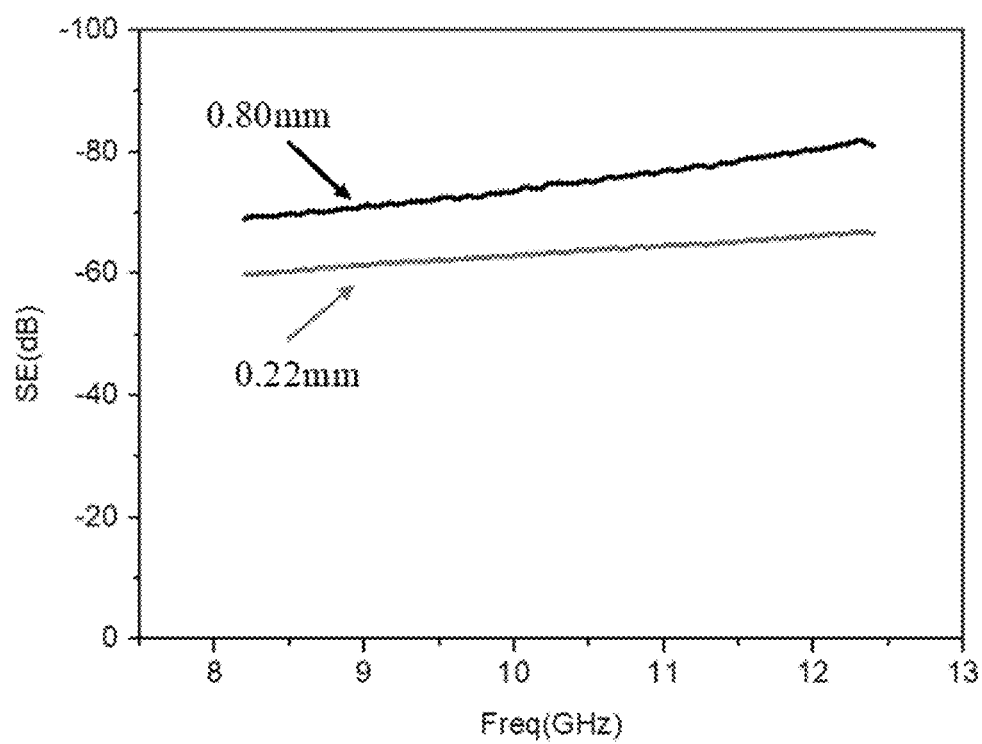
FIGS. 5A-5B are diagrams showing performance test results of 3D printed electromagnetic shielding samples prepared in embodiment 3; where.
Figure 5B:
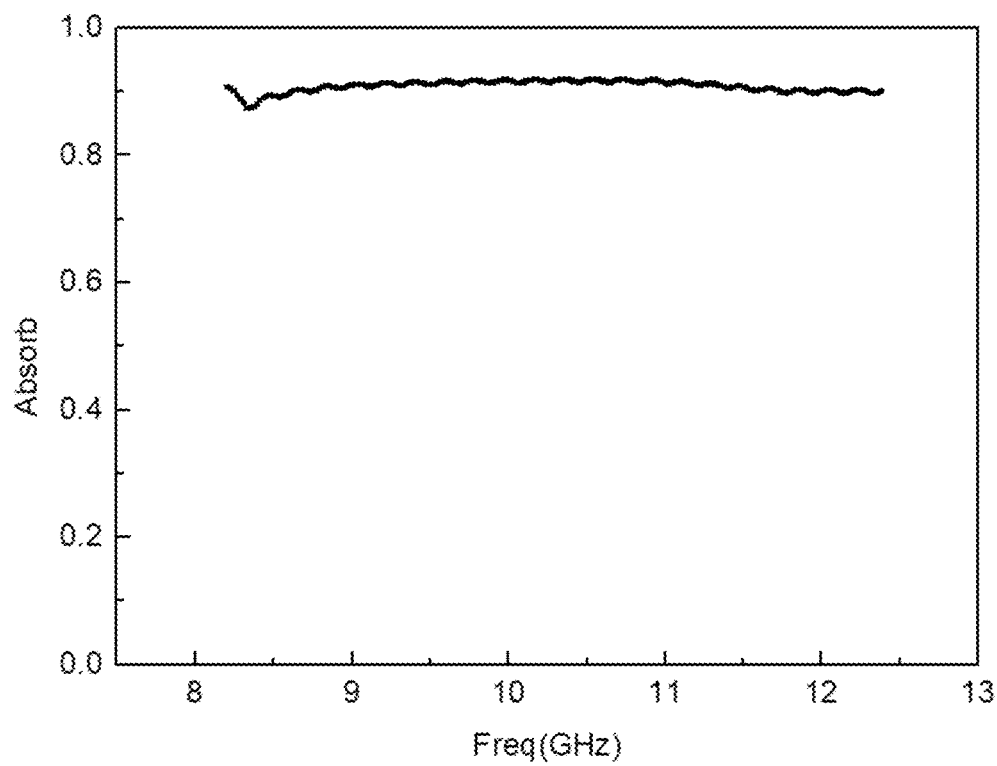

A vector network analyzer and a transmission line method are adopted to test the performance of the printed samples, and the results are shown in FIGS. 5A-B.

As mentioned above, the prepared functional ink has a good electrical conductivity and good self-healing performance, and the functional ink allows for continuous and consistent 3D printing at room temperature. As shown in FIGS. 5A-B, FIG. 5A shows that the printed samples with thickness of 0.22 mm and 0.8 mm achieve shielding effectiveness of approximately −60 dB and −70 dB in a range of 8-12 GHz, respectively, when the electromagnetic wave frequency is above 10 GHz, the absorption rate is more than 91% (referring to FIG. 5B). Therefore, the functional ink prepared by the present invention gives the printed samples excellent electromagnetic wave shielding performance and may be applied to the preparation of electromagnetic shielding functional devices.

Embodiment 4

A functional ink suitable for 3D printing includes the following components in parts by weight:

1.5 parts of catechin, 1.5 parts of silver particles, 0.5 parts of glutaraldehyde, 0.5 parts of hydrochloric acid, and 66.7 parts of ethanol.

A preparation method of the functional ink is as follows: mixing the above-mentioned components, stirring for 40 min at 25° C. and 10000 r/min to obtain the functional ink.

A method of 3D printing with the functional ink includes the following steps.

(1) The prepared functional ink is housed in a syringe barrel, the ink is extruded from a needle with a diameter of 0.60 mm under a pneumatic pressure of 10 Psi provided from an air-powered dispenser, and the printing is performed at a speed of 5 mm/s according to a preset program to obtain a product with different layers.

(2) The product obtained in step (1) is heated at 120° C. for 40 min, washed with deionized water for several times, and then dried in a vacuum oven at 85° C. for 21 h to obtain a printed sample.

Figure 6:
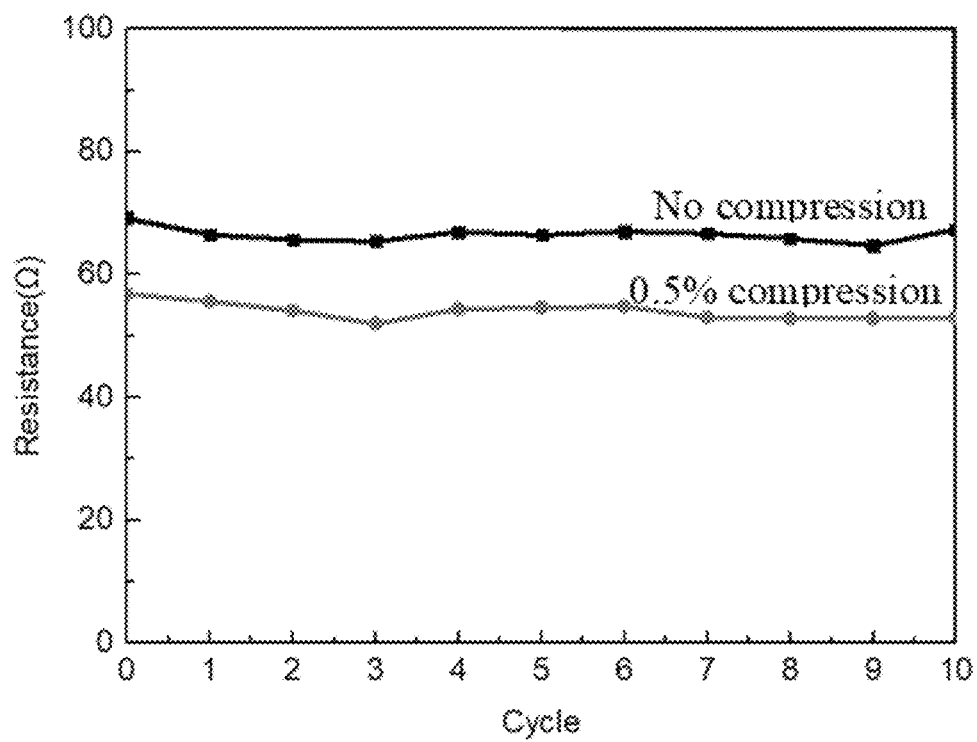
FIG. 6 is a diagram showing a resistance change of a 3D printed stress sensor prepared in embodiment 4 under different compression conditions.

The prepared printed sample is embedded in Ecoflex, cured at room temperature for 3 h, then packaged, and the resistance changes under different compression conditions are detected, and the results are shown in FIG. 6.

As mentioned above, the prepared functional ink has a good electrical conductivity and good self-healing performance, and the functional ink allows for continuous and consistent 3D printing at room temperature. The 3D printed sample has a sensitive stress sensing characteristic, and its resistance change is shown in FIG. 6, compression is repeated for 10 times and the resistance is measured for each time. During the cycle, the resistance decreases during compression and achieves stable recovery after stress relaxation. Therefore, the functional ink prepared by the present invention has an excellent stress sensing characteristic, and can be applied to the preparation of a stress sensor.

Embodiment 5

A functional ink suitable for 3D printing includes the following components in parts by weight:

0.6 parts of chitosan, 3 parts of reduced graphene oxide, 0.4 parts of butane-1,2,3,4-tetracarboxylic acid, 0.4 parts of sodium acetate, 7 parts of molybdenum disulfide, and 60 parts of acetic acid.

The above-mentioned components are mixed, following by stirring for 35 min at 30° C. and 25000 r/min to obtain the functional ink.

A method of 3D printing with the functional ink includes the following steps.

(1) The prepared functional ink is housed in a syringe barrel, the ink is extruded from a needle with a diameter of 0.10 mm under a pneumatic pressure of 20 Psi provided from an air-powered dispenser, and the printing is performed at a speed of 10 mm/s according to a preset program.

(2) The product obtained in step (1) is heated at 180° C. for 50 min, washed with deionized water for several times, and then dried in a vacuum oven at 80° C. for 24 h to obtain a printed sample.

Figure 7:
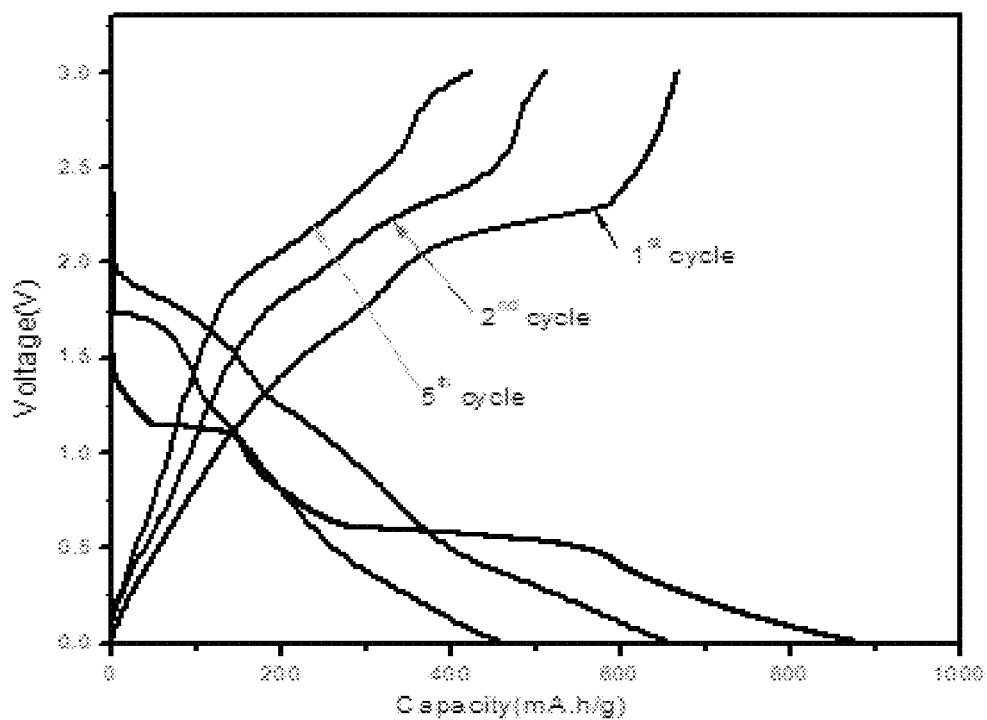
FIG. 7 is a diagram showing a charge/discharge curve of a 3D printed $MoS_2$ lithium-ion battery anode material prepared in embodiment 5 at a current density of 200 mA/g.

The electrochemical performance of a lithium-ion battery of the printed sample is tested:

The printed sample is a working electrode, lithium is a counter electrode, an electrolyte is 1 mol/L lithium hexafluorophosphate, a solvent is a mixture of ethylene carbonate and dimethyl carbonate at a volume ratio of 1:1, a testing potential is 0.01-3 V; a current density of a constant current charge/discharge test is 200 mA/g, and the results are shown in FIG. 7.

As mentioned above, the prepared functional ink has a good electrical conductivity and good self-healing performance, and the functional ink allows for continuous and consistent 3D printing at room temperature. As shown in FIG. 7, the printed sample prepared by the 3D printing provides approximately 650 mAh/g reversible capacity after a first cycle, indicating that the printed sample prepared by the present invention has excellent electrochemical performance, and the functional ink prepared by the method of the present invention may be applied to the preparation of the lithium-ion battery anode by 3D printing.

Embodiment 6

A functional ink suitable for 3D printing includes the following components in parts by weight:

1.2 parts of polyethylene glycol, 4 parts of a multi-walled carbon nanotube, 0.5 parts of citric acid, 0.5 parts of phosphomolybdic acid, 9 parts of tin dioxide, and 70 parts of ethanol.

The above-mentioned components are mixed, followed by stirring for 50 min at 30° C. and 22000 r/min to obtain the functional ink.

A method of 3D printing with the functional ink includes the following steps.

(1) The prepared functional ink is housed in a syringe barrel, the ink is extruded from a needle with a diameter of 0.10 mm under a pneumatic pressure of 16 Psi provided from an air-powered dispenser, and the printing is performed at a speed of 8 mm/s according to a preset program.

(2) The product obtained in step (1) is heated at 160° C. for 60 min, washed with deionized water for several times, and then dried in a vacuum oven at 70° C. for 22 h to obtain a printed sample.

Figure 8:
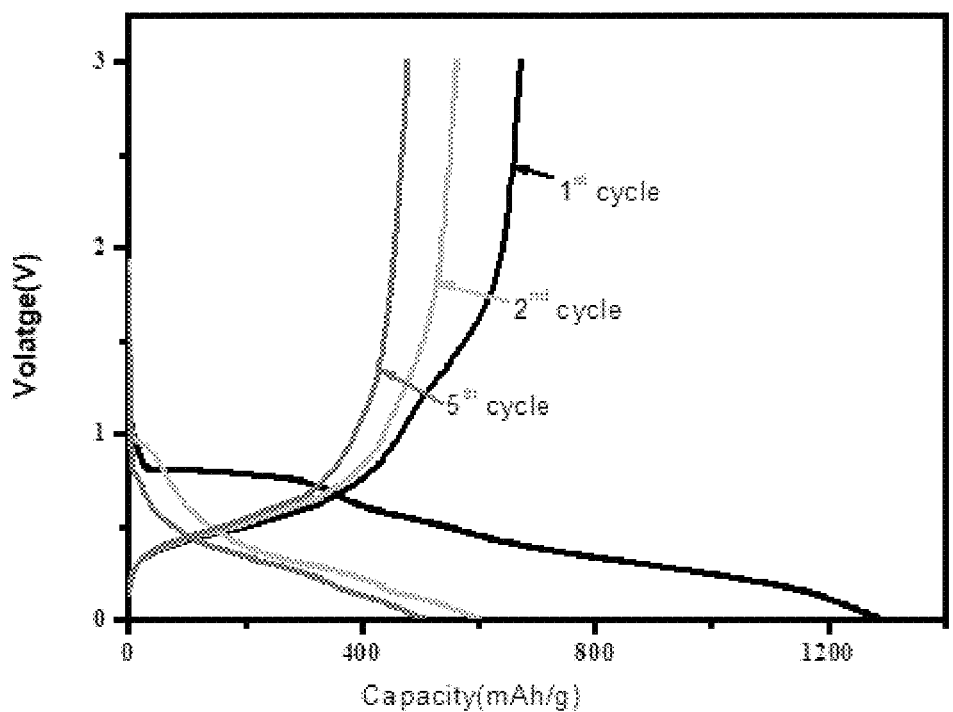
FIG. 8 is a diagram showing a charge/discharge curve of a 3D printed $SnO_2$ lithium-ion battery anode material prepared in embodiment 6 at a current density of 100 mA/g.

The electrochemical performance as a lithium-ion battery anode of the printed sample is tested:

the printed sample is a working electrode, lithium is a counter electrode, an electrolyte is 1 mol/L lithium hexafluorophosphate, a solvent is a mixture of ethylene carbonate and dimethyl carbonate at a volume ratio of 1:1, a testing potential is 0.01-3 V; a current density of a constant current charge/discharge test is 100 mA/g, and the results are shown in FIG. 8.

As mentioned above, the prepared functional ink has a good electrical conductivity and good self-healing performance, and the functional ink allows for continuous and consistent 3D printing at room temperature. As shown in FIG. 8, the coulomb efficiency of the printed sample prepared by 3D printing is greatly improved after a first cycle, and the electrode maintain approximately approximately 500 mAh/g reversible capacity after 5 cycles, indicating that the printed sample prepared by the present invention has excellent electrochemical performance, and the functional ink prepared by the method of the present invention may be applied to the preparation of the lithium-ion battery anode by the 3D printing.

What is claimed is:

1. A functional ink suitable for 3D printing, comprising the following components in parts by weight:
    0.5-1.5 parts of a regulator, 1-5 parts of a conductive material, 0.1-0.5 parts of a crosslinking agent, 0.1-0.5 parts of a catalyst, and 10-80 parts of a solvent;
    wherein the regulator provides a reversible dynamic intermolecular interaction or a reversible dynamic intramolecular interaction at room temperature;
    the regulator is at least one selected from the group consisting of chitosan, polyvinyl alcohol, nanocellulose, polyethylene glycol, catechin and tannic acid;
    the crosslinking agent is one selected from the group consisting of polymaleic acid, citric acid, propane-1,2, 3-tricarboxylic acid, butane-1,2,3,4-tetracarboxylic acid, glutaraldehyde, and borate;
    the catalyst is one selected from the group consisting of sulfuric acid, hydrochloric acid, phosphoric acid, phosphomolybdic acid, potassium bisulfate, aluminum chloride, ferric chloride, sodium bisulfate, sodium hypophosphite, sodium acetate, aluminium oxide, silicon dioxide, zinc oxide and titanium dioxide; and
    wherein the reversible dynamic intermolecular interaction or the reversible dynamic intramolecular interaction is one selected from the group consisting of covalent bonds, hydrogen bonds, and ion coordination bonds.

2. The functional ink according to claim 1, further comprising 0-10 parts of a functional nanomaterial.

3. The functional ink according to claim 1, wherein the conductive material is one selected from the group consisting of a conductive carbon material, a conductive polymer and a conductive metal particle.

4. The functional ink according to claim 2, wherein the functional nanomaterial is at least one selected from the group consisting of a metal oxide, a metal sulfide, a transition metal carbide, a transition metal nitride, an inorganic nonmetallic element, a redox small molecule, a phosphate and a titanate, wherein the metal oxide, the metal sulfide, the transition metal carbide, the transition metal nitride, the inorganic nonmetallic element, the redox small molecule, the phosphate and the titanate have electricity and magnetism properties.

5. The functional ink according to claim 4, wherein the functional nanomaterial is at least one selected from the group consisting of $SnO_2$, $Fe_3O_4$, $MnO_2$, $MoS_2$, $SnS_2$, MXenes, TiNx, MoNx, Si, Sn, Viologen, $LiFePO_4$ and $Li_4T_{15}O_{12}$.

6. A preparation method of the functional ink suitable for the 3D printing comprising the following steps:
   providing a functional ink suitable for 3D printing, comprising the following components in parts by weight:
   0.5-1.5 parts of a regulator, 1-5 parts of a conductive material, 0.1-0.5 parts of a crosslinking agent, 0.1-0.5 parts of a catalyst, and 10-80 parts of a solvent;
   wherein the regulator provides a reversible dynamic intermolecular interaction or a reversible dynamic intramolecular interaction at room temperature;
   the regulator is at least one selected from the group consisting of chitosan, polyvinyl alcohol, nanocellulose, polyethylene glycol, catechin and tannic acid;
   the crosslinking agent is one selected from the group consisting of polymaleic acid, citric acid, propane-1,2,3-tricarboxylic acid, butane-1,2,3,4-tetracarboxylic acid, glutaraldehyde, and borate;
   the catalyst is one selected from the group consisting of sulfuric acid, hydrochloric acid, phosphoric acid, phosphomolybdic acid, potassium bisulfate, aluminum chloride, ferric chloride, sodium bisulfate, sodium hypophosphite, sodium acetate, aluminium oxide, silicon dioxide, zinc oxide and titanium dioxide; and
   under conditions of 20-35° C. and 8000-30000 r/min, mixing the components, and stirring the components for 20-60 min according to a formulation.

7. The functional ink according to claim 2, wherein the conductive material is one selected from the group consisting of a conductive carbon material, a conductive polymer and a conductive metal particle.

8. The preparation method according to claim 6, wherein the functional ink further comprises 0-10 parts of a functional nanomaterial.

9. The preparation method according to claim 6, wherein the reversible dynamic intermolecular interaction or the reversible dynamic intramolecular interaction is one selected from the group consisting of covalent bonds, hydrogen bonds and ion coordination bonds.

10. The preparation method according to claim 6, wherein the conductive material is one selected from the group consisting of a conductive carbon material, a conductive polymer and a conductive metal particle.

* * * * *